(12) United States Patent
Liao

(10) Patent No.: US 7,580,201 B2
(45) Date of Patent: Aug. 25, 2009

(54) ZOOM LENS SYSTEM

(75) Inventor: Chen-cheng Liao, T.E.P.Z. (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 11/877,477

(22) Filed: Oct. 23, 2007

(65) Prior Publication Data

US 2008/0112060 A1   May 15, 2008

(30) Foreign Application Priority Data

Nov. 15, 2006   (TW) ............... 95142285 A

(51) Int. Cl.
*G02B 15/14*   (2006.01)

(52) U.S. Cl. .......... 359/687; 359/684; 348/240.3; 396/72

(58) Field of Classification Search .......... 359/676, 359/683, 684, 686, 687; 396/72–88; 348/240.99–240.3
See application file for complete search history.

(56) References Cited

U.S. PATENT DOCUMENTS

| 5,103,343 | A | 4/1992 | Sekita |
| 5,712,733 | A | 1/1998 | Mukaiya |
| 6,014,268 | A | 1/2000 | Yahagi |
| 6,744,571 | B2 | 6/2004 | Ishii et al. |
| 7,113,346 | B1 * | 9/2006 | Souma et al. ............... 359/687 |
| 2005/0002115 | A1 * | 1/2005 | Mihara ....................... 359/686 |
| 2006/0044423 | A1 * | 3/2006 | Hagimori et al. ......... 348/240.3 |
| 2007/0115561 | A1 * | 5/2007 | Chuang et al. .............. 359/687 |

* cited by examiner

*Primary Examiner*—Darryl J Collins

(57) ABSTRACT

A zoom lens system includes, in order from an object side to an image side, a first positive lens group (G1), a second negative lens group (G2), a third positive lens group (G3), and a fourth positive lens group (G4). The second and third lens groups are movable for varying the focal length. The zoom lens system offers a four-times zoom ratio, and employs two plastic aspheric lenses (L3, L9) and a resin hybrid lens (L6). The first lens group consists of two lenses (L1, L2) arranged in an abutting relationship. The second and third lens groups each includes a pair of cemented lenses (L4, L5; L7, L8).

15 Claims, 18 Drawing Sheets

Wide-Angle End

Telephoto End

Wide-Angle End

Telephoto End

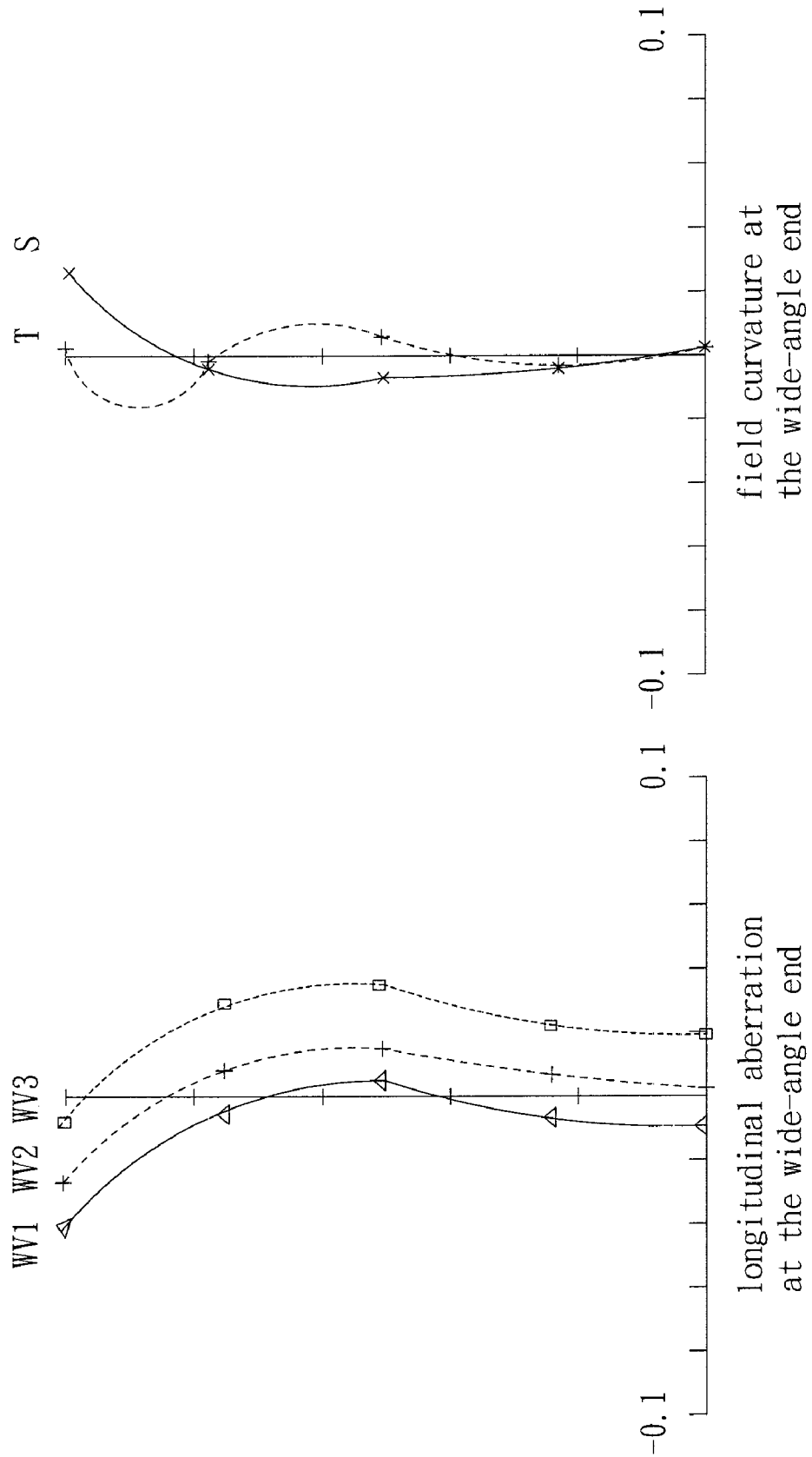

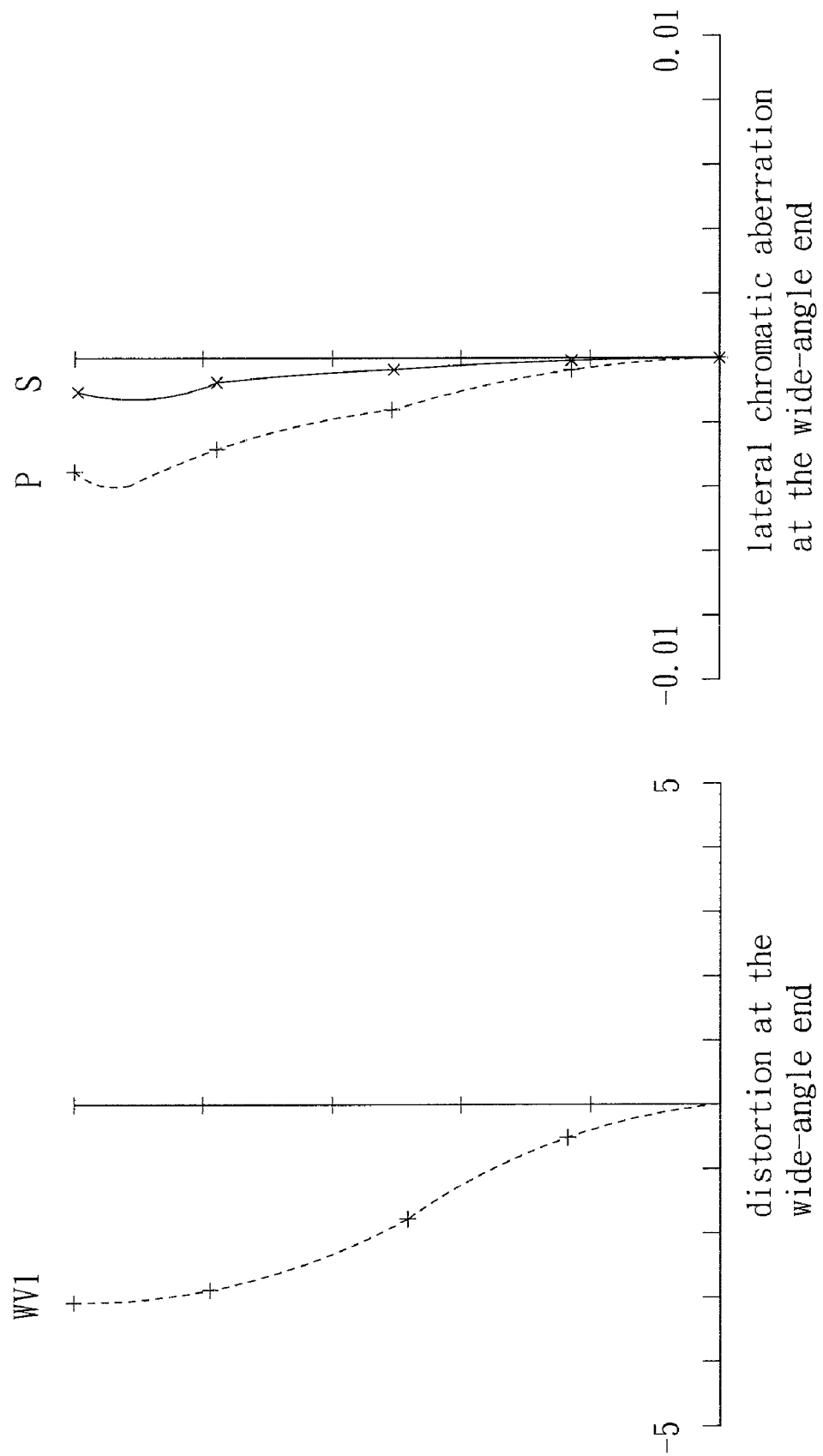

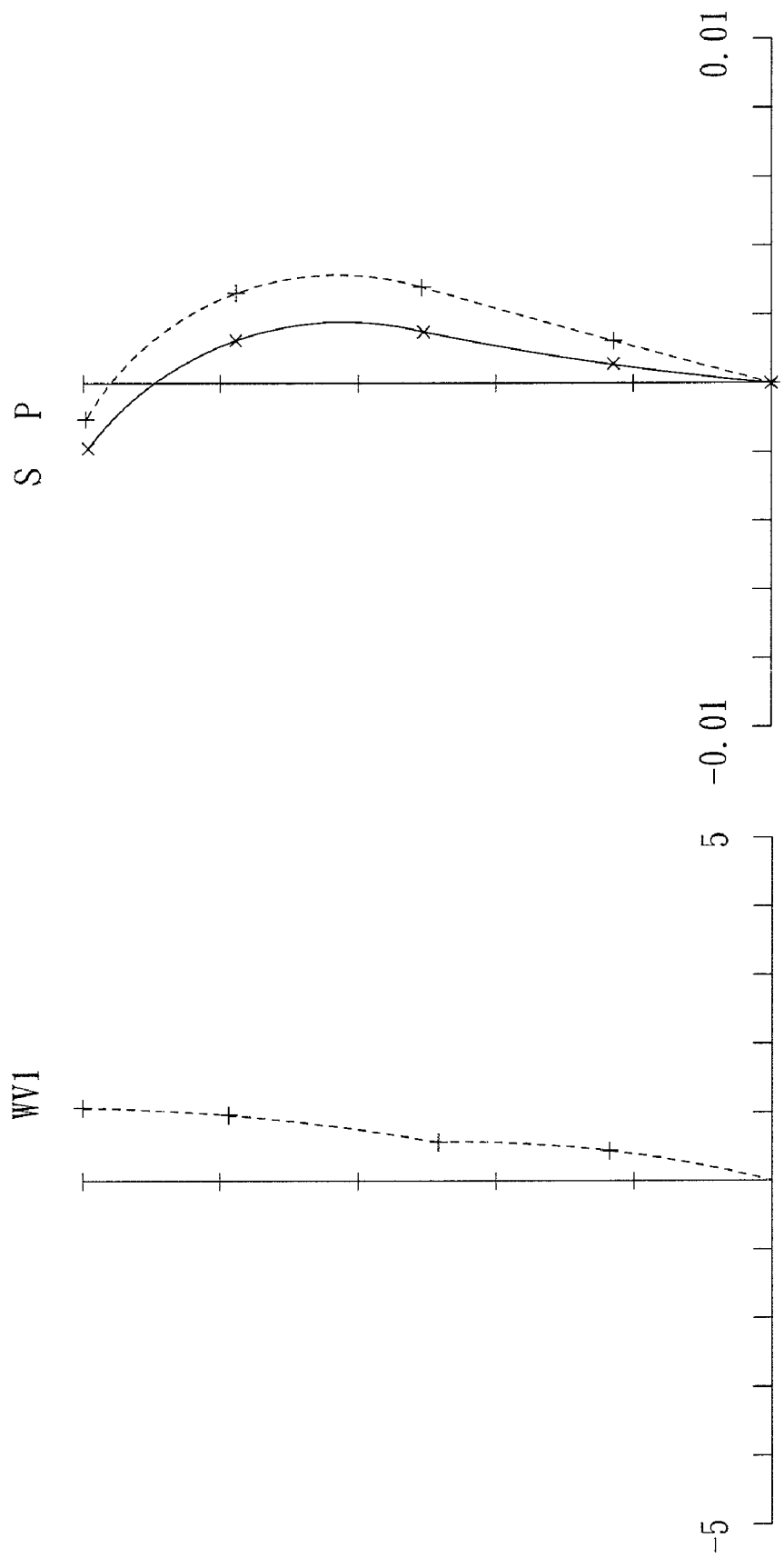

Wide-Angle End

Telephoto End

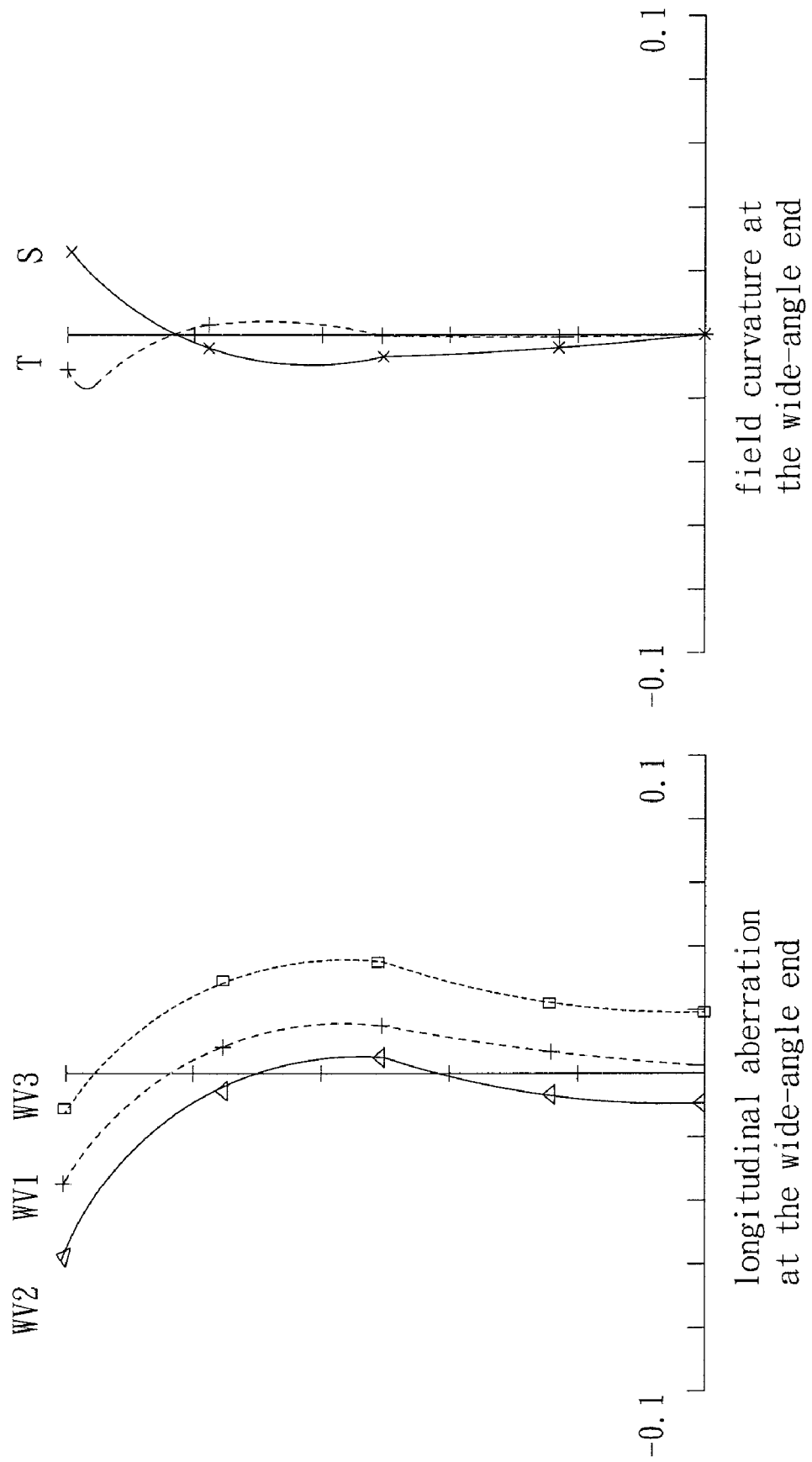

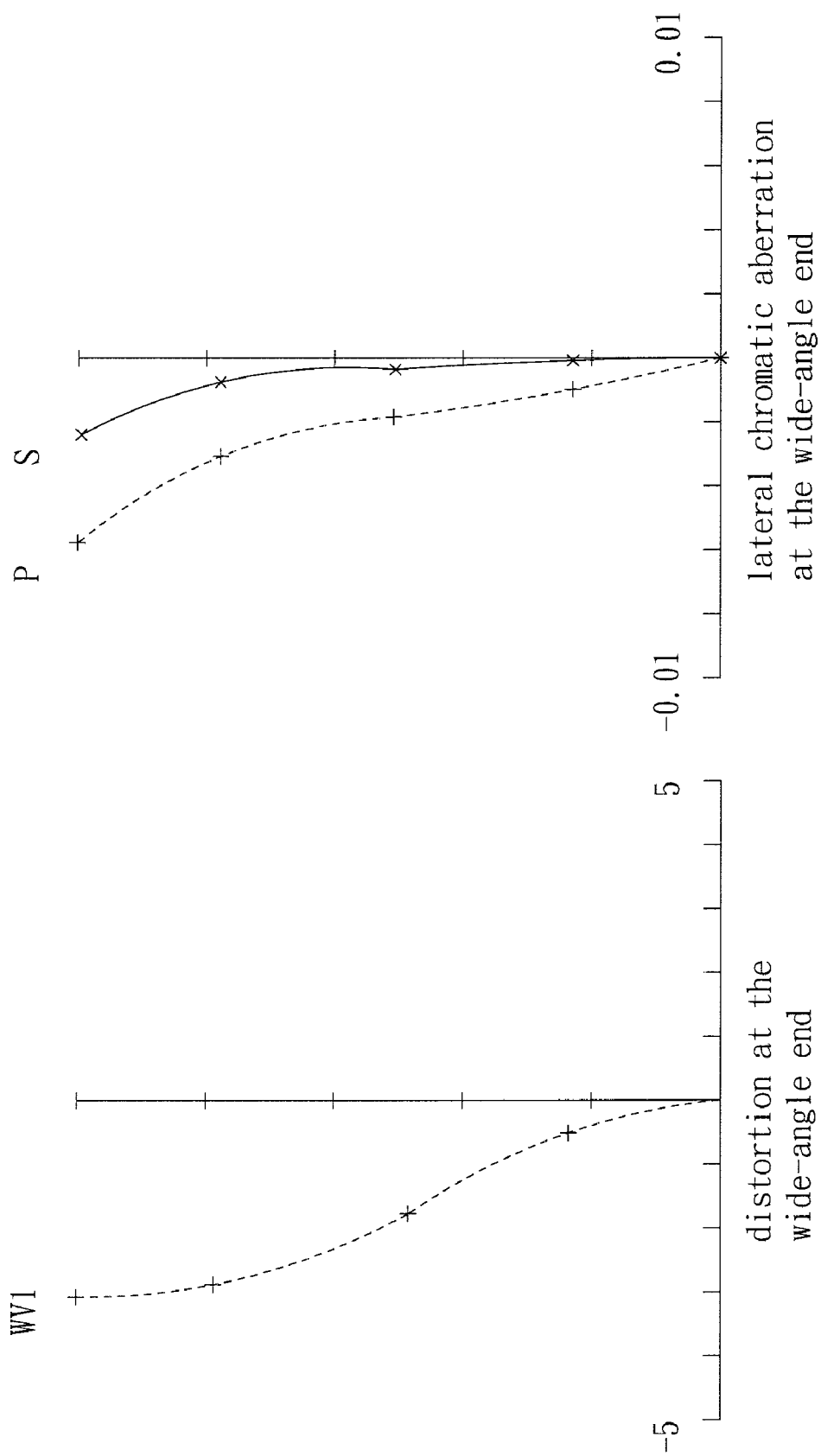

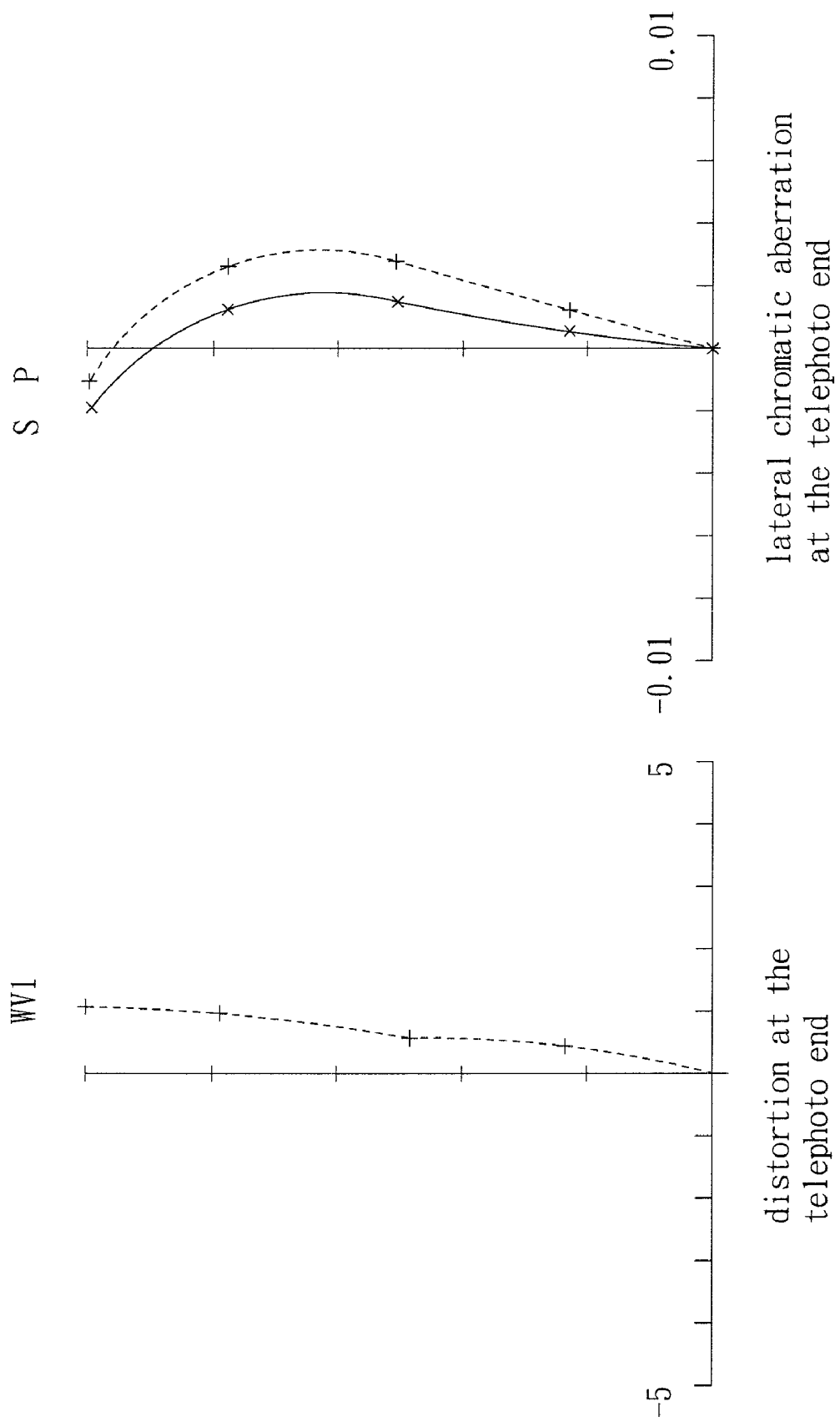

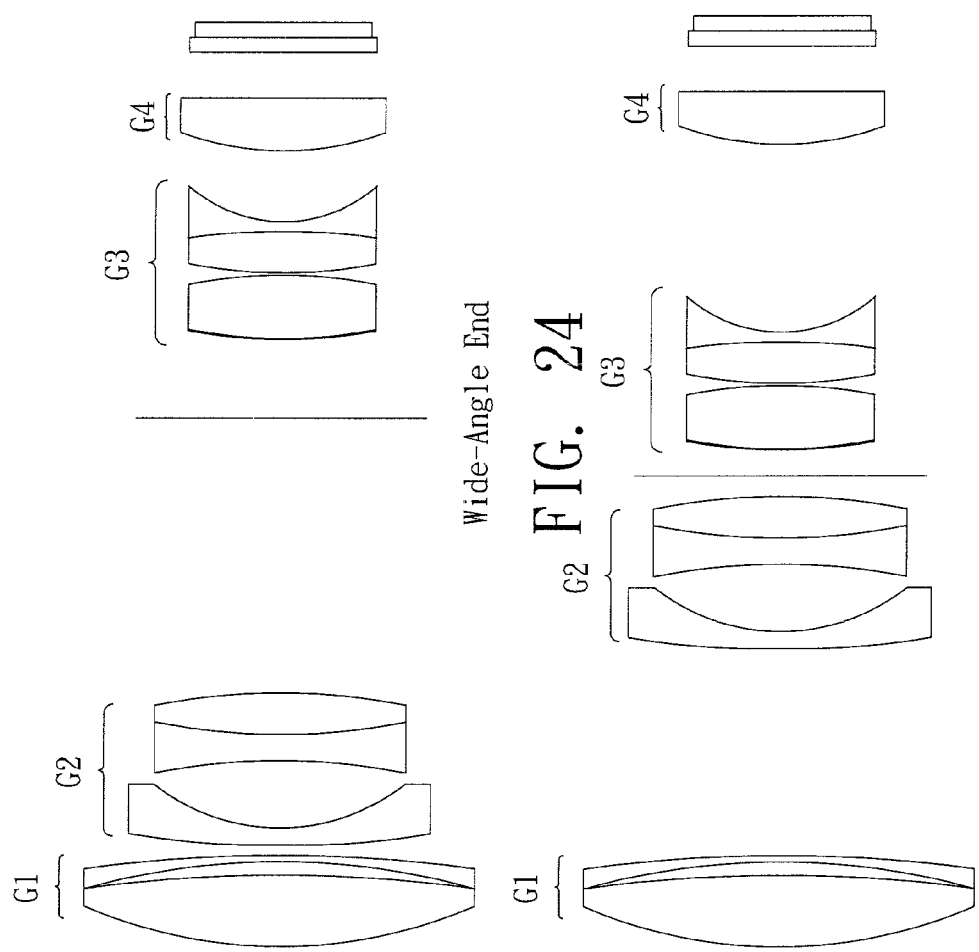

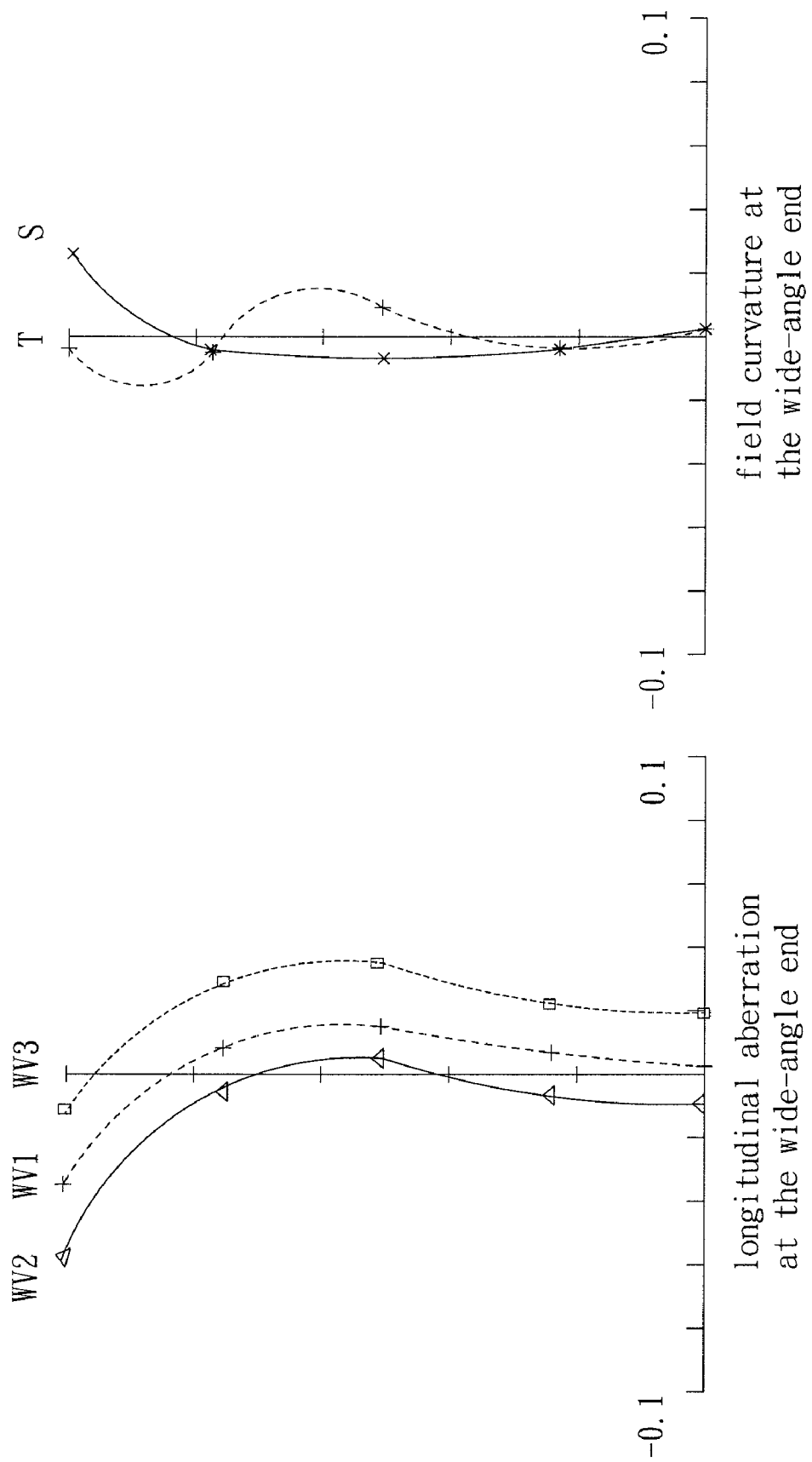

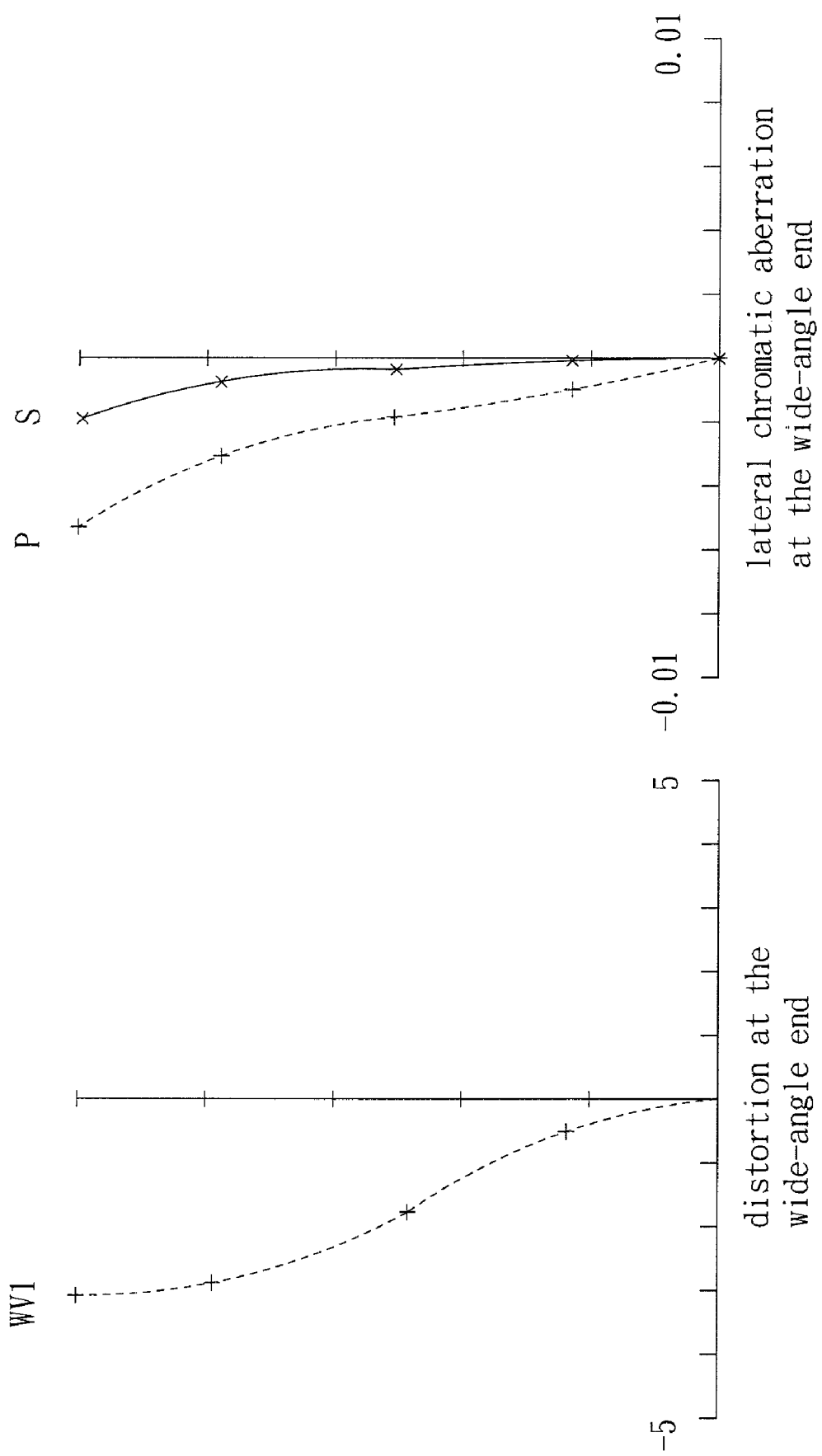

longitudinal aberration at the telephoto end field curvature at the telephoto end

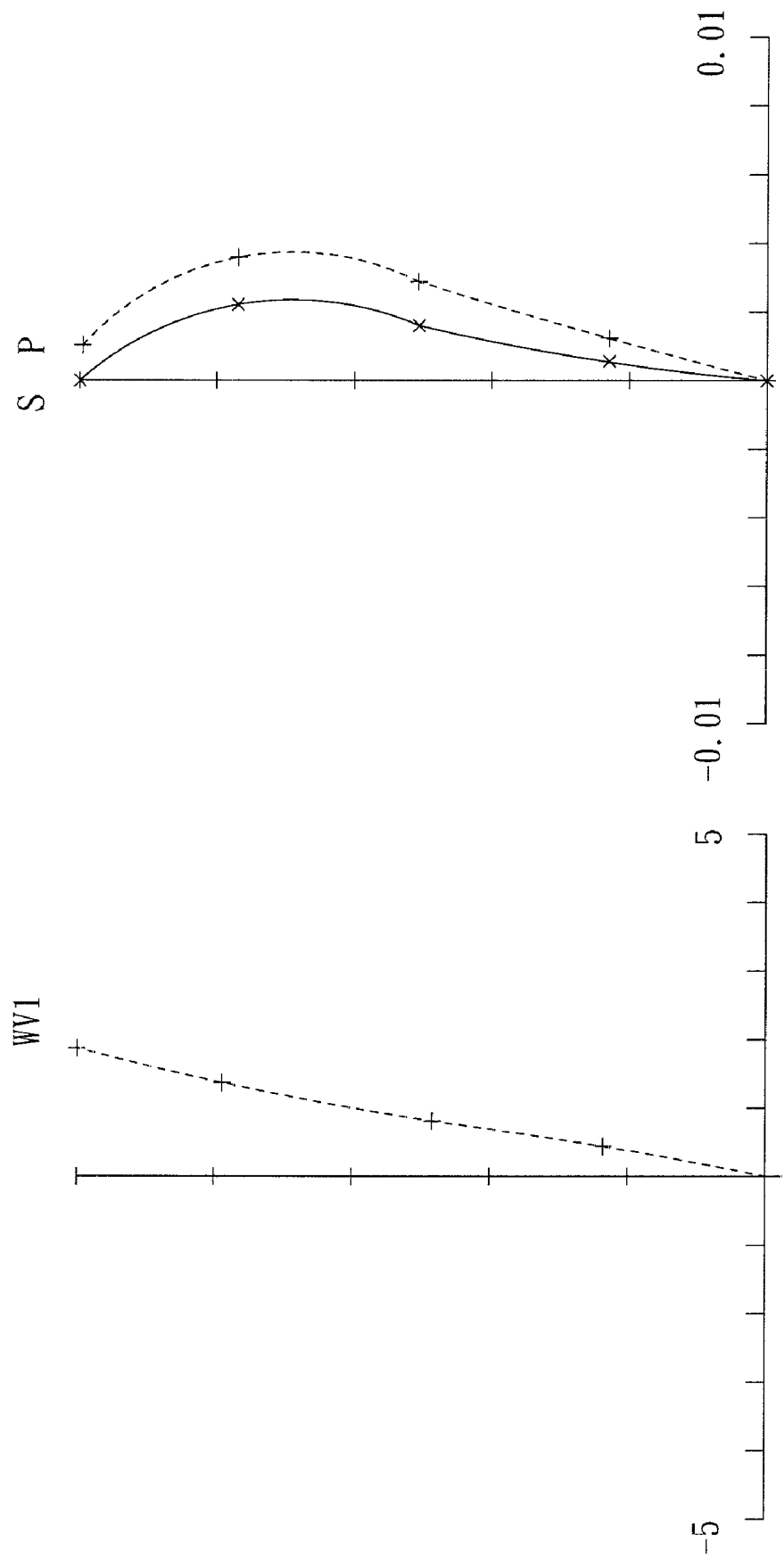
FIG. 33 lateral chromatic aberration at the telephoto end
FIG. 32 distortion at the telephoto end

ZOOM LENS SYSTEM

BACKGROUND OF THE INVENTION

1. Field of the Invention

The present invention relates to a zoom lens system, and particularly relates to a zoom lens system that includes plastic aspheric lenses and a resin hybrid lens to reduce the overall length and the cost. The zoom lens system further includes two pairs of cemented lenses and a pair of abutting lenses to facilitate assembly.

2. Description of Prior Art

Conventionally, an optical lens system is composed of a plurality of spherical lenses. However, spherical lenses cannot focus light from the center and periphery to the same point, which is called "spherical aberration". The solution is to employ a number of additional spherical correction lenses or to introduce an aspheric surface. However, the employment of additional spherical correction lenses results in increase of the cost and elongation of the length of the lens system. The introduction of an aspheric surface effectively corrects aberration, and a corresponding aspheric lens functions equivalent to several spherical lenses, whereby the cost can be reduced and a compact lens system can be ensured. In addition, an aspheric lens is generally made of plastic such as compound resin by injection molding. This facilitates a large-scale and efficient manufacture, and thus further decreases the cost.

When designing a zoom lens system, various factors must be considered to effectively correct various aberrations at different focal lengths due to zooming of the zoom lens system. Various conventional zoom lens system designs are disclosed in U.S. Pat. Nos. 6,744,571, 6,014,268, 5,712,733, and 5,103,343. FIGS. 1A and 1B illustrate two examples of the conventional zoom lens systems. However, in these conventional designs, to provide a four-times zoom ratio, three lens groups are generally adopted, which necessitates a long overall length of the zoom lens system. When four lens groups are adopted, the number of the constituent lenses and the manufacture cost are generally increased.

SUMMARY OF THE INVENTION

To overcome the above disadvantages in the prior art, the object of the present invention is to provide a four-group zoom lens system that consists of a reduced number of constituent lenses while offering a four-times zoom ratio and a high image resolution. The present zoom lens system adopts two plastic aspheric lenses and a resin hybrid lens to reduce the number of constituent lenses.

It is known that, to increase the zoom ratio of a zoom lens system, two methods may be employed. One method is to increase the refractive power of the zooming lens group, which will bring the problem of aberration fluctuations during zooming. The other method is to increase the movement amount of the zooming lens group. However, when three lens groups are adopted to provide an increased zoom ratio such as a four-times zoom ratio, an increased movement space is required, which results in a long overall length of the zoom lens system. When four lens groups are adopted, the movement space can be reduced. However, for a four-group zoom lens system, when the constituent lenses are all spherical lenses, a large amount of spherical lenses must be used for effective aberration correction. This results in a significant increase of the cost, the volume and the weight of the zoom lens system. To overcome these problems, aspheric lenses may be employed for effective aberration correction. To further reduce the manufacture cost, the aspheric lenses may be injection molded with plastic material.

Accordingly, the present invention provides a zoom lens system consisting of four lens groups. The present zoom lens system includes, in order from an object side to an image side, a first lens group of positive refractive power for gathering incoming light, a second lens group of negative refractive power for effecting focal length change, a third lens group of positive refractive power for compensating for aberrations and image plane shift, and a fourth lens group of positive refractive power for focusing. The third lens group consists of a hybrid lens and two cemented lenses. The hybrid lens has a resin layer arranged on an object-side surface thereof. The fourth lens group consists of a plastic lens having at least one aspheric surface. The present zoom lens system further includes a stop disposed between the second and third lens groups. The stop is movable during zooming. Zooming is effected by varying the distance between the second and third lens groups. The first and fourth lens groups are stationary.

The first lens group is adapted to focus the image of the object on the object plane of the second lens group. The second lens group is responsible for zooming, so as to attain the maximum zoom ratio. The third lens group is adapted to compensate for image plane shift due to focal length change and thereby maintain the position of the image plane. The fourth lens group is adapted to focus the image onto a predetermined image plane.

The first and second lens groups of the present zoom lens system satisfy the following condition:

$$0.15 < \left|\frac{F2}{F1}\right| < 0.4$$

where F1 represents the focal length of the first lens group, and F2 represents the focal length of the second lens group. When the absolute value of the ratio of F2 to F1 exceeds the upper limit of 0.4, the refracting power of the second lens group decreases, and the entire lens system is out of balance since only the second lens group has a negative focal length. When the absolute value of the ratio of F2 to F1 is smaller than the lower limit of 0.15, a high zoom ratio cannot be obtained within a short length. To ensure a high zoom ratio, the distance between the first and second lens groups must be increased. In this case, the diameter of the first lens of the first lens group should be increased, and thus the thickness of the first lens must be increased for facilitating machining.

The second and third lens groups of the present zoom lens system satisfy the following condition:

$$0.55 < \left|\frac{F2}{F3}\right| < 1.2$$

where F2, as indicated above, represents the focal length of the second lens group, and F3 represents the focal length of the third lens group. When the absolute value of the ratio of F2 to F3 exceeds the upper limit of 1.2, the refracting power of the third lens group increases and thus astigmatism rapidly increases. When the absolute value of the ratio of F2 to F3 is smaller than the lower limit of 0.55, the refracting power of the third lens group decreases, and thus the overall length of the entire lens system is elongated, which is apart from the compactness requirement.

BRIEF DESCRIPTION OF THE DRAWINGS

The present invention may best be understood through the following description with reference to the accompanying drawings, in which:

FIG. 6 shows spherical longitudinal aberration at the wide-angle end of the zoom lens system of Numerical Embodiment 1 in accordance with the present invention;

FIG. 7 shows field curvature at the wide-angle end of the zoom lens system of Numerical Embodiment 1 in accordance with the present invention;

FIG. 8 shows distortion at the wide-angle end of the zoom lens system of Numerical Embodiment 1 in accordance with the present invention;

FIG. 9 shows lateral chromatic aberration at the wide-angle end of the zoom lens system of Numerical Embodiment 1 in accordance with the present invention;

FIG. 12 shows distortion at the telephoto end of the zoom lens system of Numerical Embodiment 1 in accordance with the present invention;

FIG. 13 shows lateral chromatic aberration at the telephoto end of the zoom lens system of Numerical Embodiment 1 in accordance with the present invention;

FIG. 16 shows spherical longitudinal aberration at the wide-angle end of the zoom lens system of Numerical Embodiment 2 in accordance with the present invention;

FIG. 17 shows field curvature at the wide-angle end of the zoom lens system of Numerical Embodiment 2 in accordance with the present invention;

FIG. 18 shows distortion at the wide-angle end of the zoom lens system of Numerical Embodiment 2 in accordance with the present invention;

FIG. 19 shows lateral chromatic aberration at the wide-angle end of the zoom lens system of Numerical Embodiment 2 in accordance with the present invention;

FIG. 22 shows distortion at the telephoto end of the zoom lens system of Numerical Embodiment 2 in accordance with the present invention;

FIG. 23 shows lateral chromatic aberration at the telephoto end of the zoom lens system of Numerical Embodiment 2 in accordance with the present invention;

FIGS. 24 and 25 respectively illustrate positions of lens groups constituting the zoom lens system in accordance with Numeral Embodiment 3 of the present invention at the wide-angle end and the telephoto end;

FIG. 26 shows spherical longitudinal aberration at the wide-angle end of the zoom lens system of Numerical Embodiment 3 in accordance with the present invention;

FIG. 27 shows field curvature at the wide-angle end of the zoom lens system of Numerical Embodiment 3 in accordance with the present invention;

FIG. 28 shows distortion at the wide-angle end of the zoom lens system of Numerical Embodiment 3 in accordance with the present invention;

FIG. 29 shows lateral chromatic aberration at the wide-angle end of the zoom lens system of Numerical Embodiment 3 in accordance with the present invention;

FIG. 32 shows distortion at the telephoto end of the zoom lens system of Numerical Embodiment 3 in accordance with the present invention; and FIG. 33 shows lateral chromatic aberration at the telephoto end of the zoom lens system of Numerical Embodiment 3 in accordance with the present invention.

DETAILED DESCRIPTION OF THE PREFERRED EMBODIMENTS

Figure 1A:
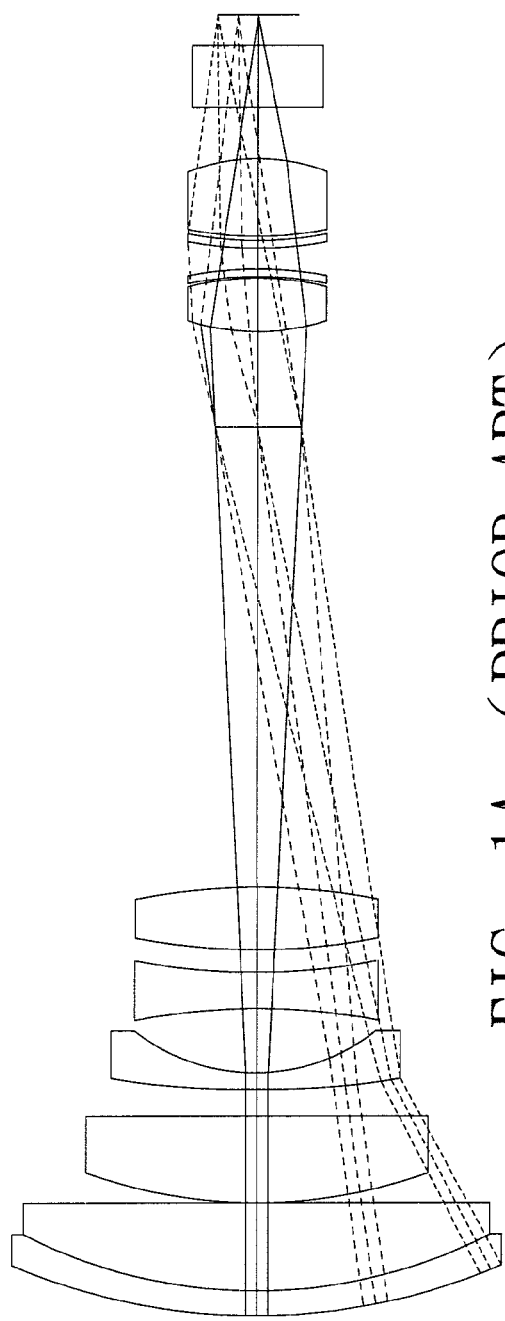
FIGS. 1A and 1B show conventional zoom lens systems.
Figure 1B:
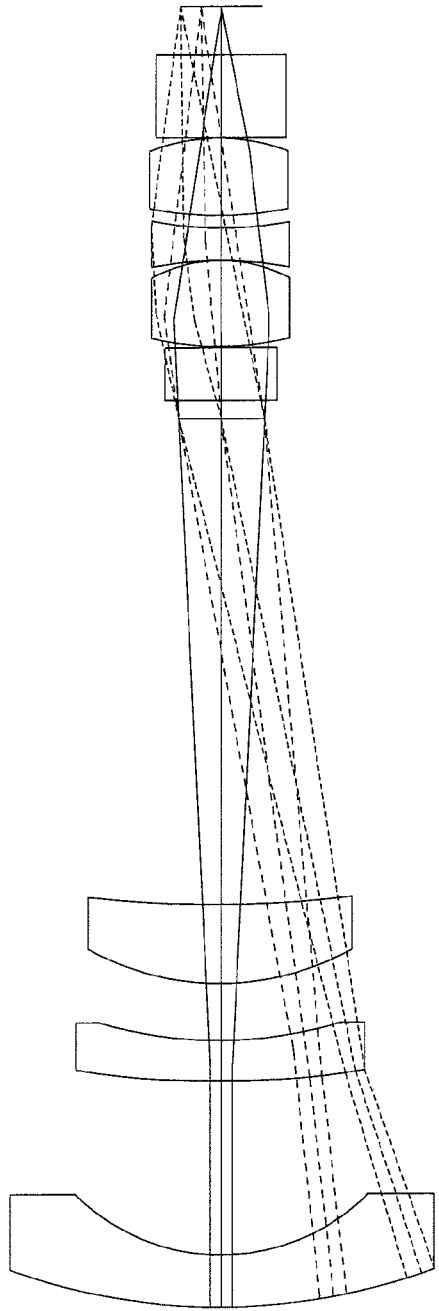
Figure 2:
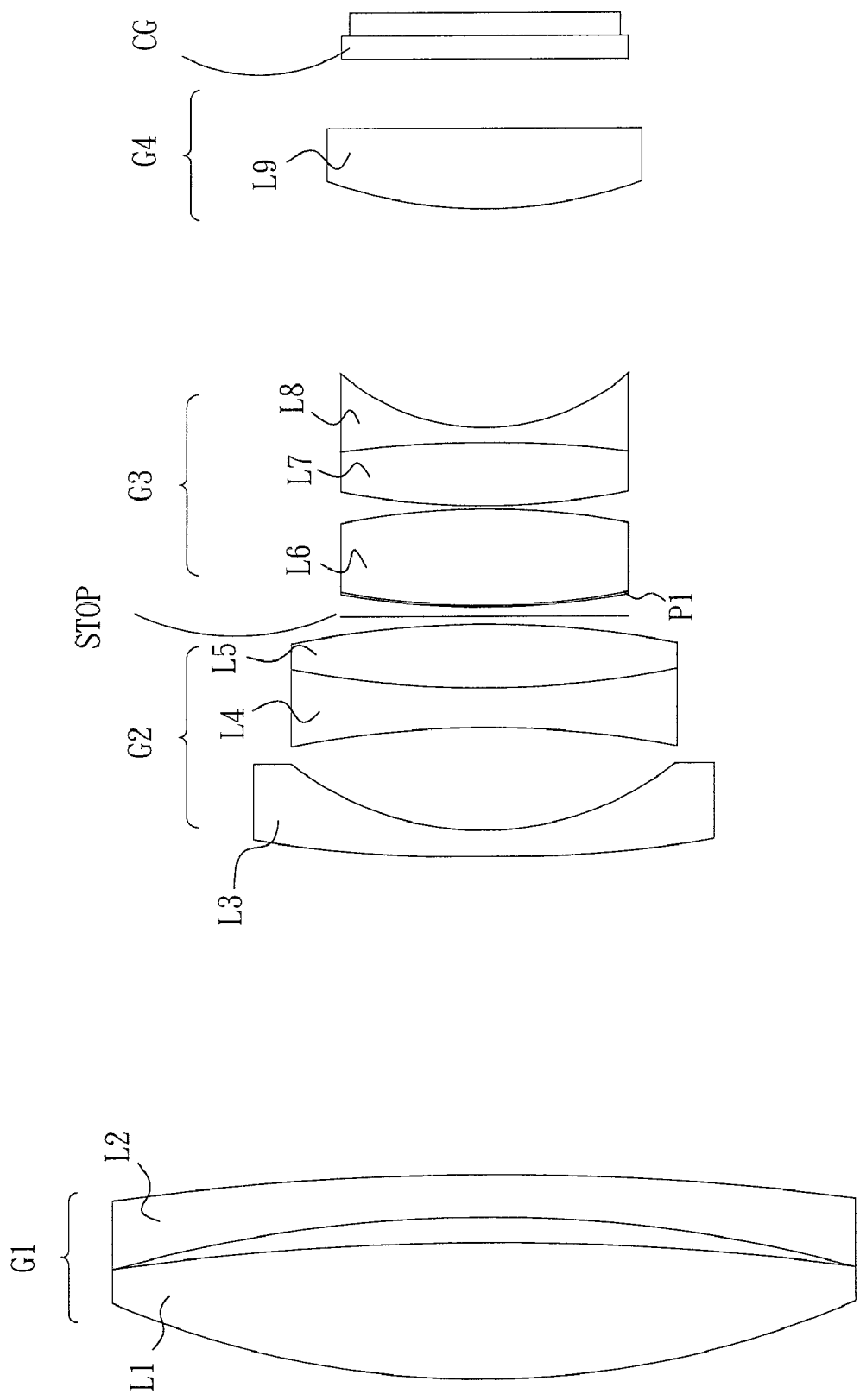
FIG. 2 shows a zoom lens system constructed in accordance with the present invention at a telephoto end.
Figure 3:
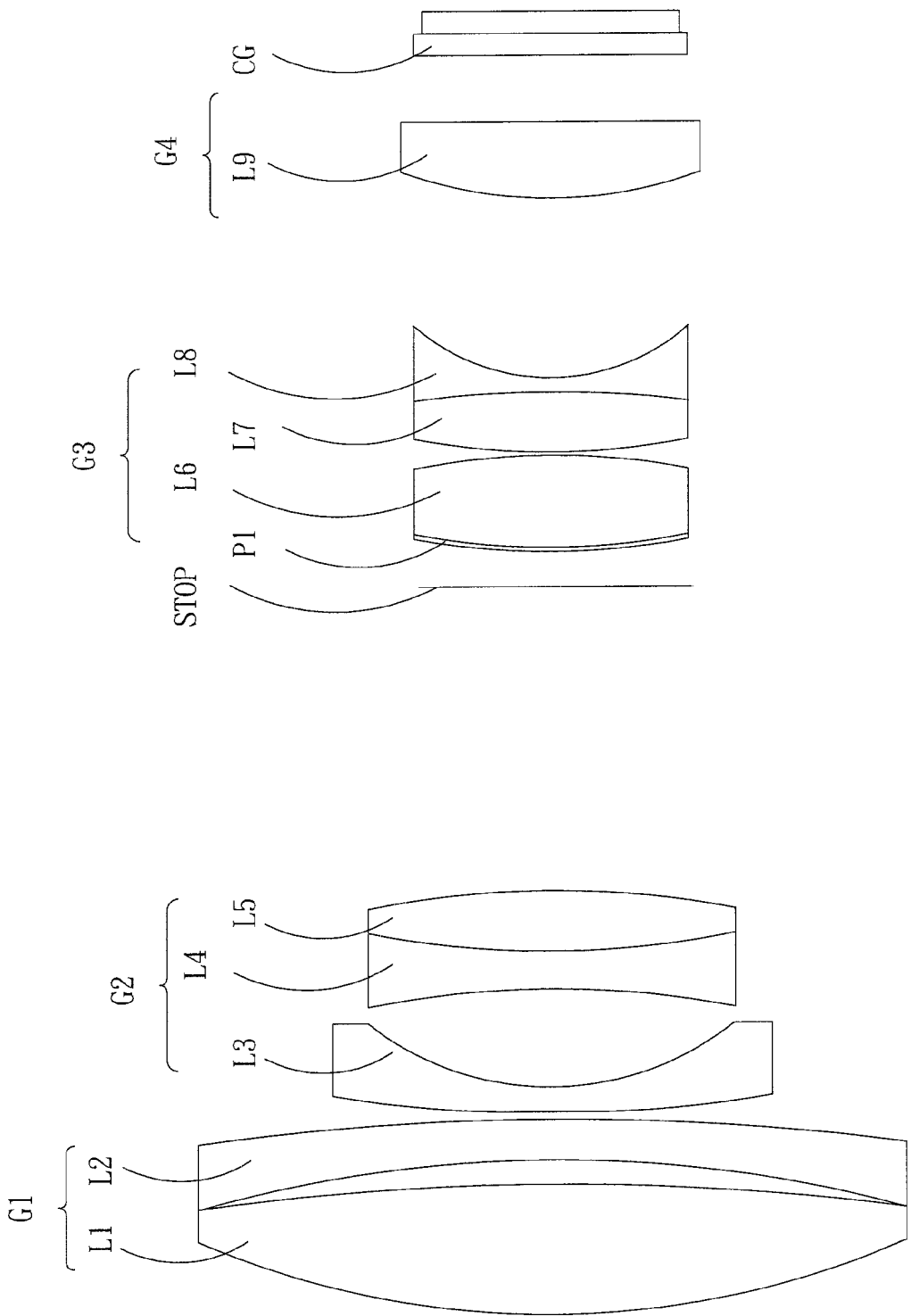
FIG. 3 shows the zoom lens system in accordance with the present invention at a wide-angle end.

FIGS. 2 and 3 are schematic views of a zoom lens system in accordance with the present invention, respectively showing the lens arrangement at a telephoto end and a wide-angle end. The zoom lens system of the present invention comprises, in order from an object side to an image side, a first lens group G1 of a positive refractive power, a second lens group G2 of a negative refractive power, a stop, a third lens group G3 of a positive refractive power, a fourth lens group G4 of a positive refractive power, and a cover glass CG. The first lens group G1 is composed of a first positive lens L1 and a first negative lens L2. The second lens group G2 is composed of a first aspheric lens L3, a second negative lens L4 and a second positive lens L5. The third lens group G3 is composed of a third positive lens L6, a fourth positive lens L7 and a third negative lens L8. The fourth lens group G4 is composed of a second aspheric lens L9. The cover glass CG may be coated with an anti-reflection film or an infrared filtering film to obtain a better image. The first positive lens L1 and the first negative lens L2 of the first lens group G1 are arranged in an abutting relationship with each other. The second negative lens L4 and the second positive lens L5 of the second lens group G2 are cemented with each other. The fourth positive lens L7 and the third negative lens L8 of the third lens group G3 are also cemented with each other. The third positive lens L6 of the third lens group G3 is a hybrid lens having a resin layer P1 formed thereon.

As discussed above, the zoom lens system incorporates a first aspheric lens L3 in the second lens group G2, a second aspheric lens L9 in the fourth lens group G4, and a resin hybrid lens L6 in the third lens group G3. Accordingly, the number of constituent lenses of the present zoom lens system can be significantly reduced, since each of these lenses functions equivalent to several spherical lenses. To facilitate manufacture and further reduce the cost, both the first aspheric lens L3 and the second aspheric lens L9 are preferably made of plastic.

Tables 1-3 show numerical data, lens arrangement and aberration plots of the compact zoom lens in accordance with Numerical Embodiment 1. Table 1 shows numerical data of constituent lenses for Numerical Embodiment 1, wherein "I" represents the order of the lens surface counting from the object side, "Ri" represents the radius of curvature (mm) of the ith lens surface, "D" represents the distance between the ith surface and the next surface ((i+1)th surface), which, when the ith surface and the next ((i+1)th) surface are respectively the object-side surface and the image-side surface of a lens, indicates the thickness of the lens, and "Nd" and "Vd" respectively represent the refractive index (d-line) and Abbe number $$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10}$$

where D represents a sag amount which is defined as a distance from a point on the aspheric surface to a plane tangential to the aspheric surface at the optical axis; H represents a height of a point on the aspheric surface with respect to the optical axis; $C=1/r$, and r is the paraxial radius of curvature; K represents a cone constant; and $E_4$, $E_6$, $E_8$, and $E_{10}$ are aspheric coefficients of fourth, sixth, eighth, and tenth order terms.

TABLE 2

| surface (i) | K | $E_4$ | $E_6$ | $E_8$ | $E_{10}$ |
|---|---|---|---|---|---|
| 5 | 0 | $6.4974 \times 10^{-5}$ | $-2.8539 \times 10^{-7}$ | $6.0080 \times 10^{-10}$ | 0 |
| 6 | 0 | $2.9736 \times 10^{-5}$ | $6.1087 \times 10^{-7}$ | 0 | 0 |
| 11 | 0.001707 | $-1.51 \times 10^{-4}$ | $6.6001 \times 10^{-7}$ | $-3.3193 \times 10^{-8}$ | $5.1675 \times 10^{-10}$ |
| 17 | 0 | $-7.6936 \times 10^{-5}$ | $6.5992 \times 10^{-7}$ | $-1.0868 \times 10^{-8}$ | $2.7339 \times 10^{-11}$ |

(d-line) of the lens. In addition, "Fno" represents the F-number, that is, the effective aperture of the present zoom lens system. In Numerical Embodiment 1, Fno is 2.8 to 4.3.

Table 3 shows variable distances (in unit of millimeters) between adjacent lens groups at the respective system effective focal lengths, namely, at the wide-angle end (W, f=8.05), an intermediate zoom position (M, f=16.07) and the telephoto end (T, f=31.31) of the zoom lens system of Numerical Embodiment 1.

TABLE 1

| Surface (i) | Ri (mm) | D (mm) | Nd | Vd | Lens | Group |
|---|---|---|---|---|---|---|
| 1 | 31.4979 | 5.974 | 1.4875 | 70.23 | L1 | G1 |
| 2 | -103.4744 | 0.711 | | | | |
| 3 | -67.8529 | 1.8 | 1.8466 | 23.78 | L2 | |
| 4 | -91.0189 | variable distance 1 | | | | |
| 5 | -329.6936 | 2.5 | 1.5855 | 29.9 | L3 | G2 |
| 6 | 8.4989 | 5.896 | | | | |
| 7 | -17.8119 | 2.4 | 1.4875 | 70.23 | L4 | |
| 8 | 17.4042 | 3.881 | 1.8052 | 25.43 | L5 | |
| 9 | -90.9936 | variable distance 2 | | | | |
| STOP | infinite | variable distance 3 | | | | |
| 11 | 11.7565 | 0.08 | 1.52 | 52 | P1 | G3 |
| 12 | 10.9628 | 5.3 | 1.5688 | 56.36 | L6 | |
| 13 | -22.75 | 0.1 | | | | |
| 14 | 11.7696 | 3.983 | 1.7432 | 49.3 | L7 | |
| 15 | -60.5215 | 0.762 | 1.8466 | 23.8 | L8 | |
| 16 | 6.6212 | variable distance 4 | | | | |
| 17 | 9.7707 | 3.0 | 1.5247 | 56.2 | L9 | G4 |
| 18 | 84.9241 | 0 | | | | |
| 19 | infinite | 2.0 | 1.51633 | 64.1 | CG | |
| 20 | infinite | | | | | |

TABLE 3

| Effective Focal Length | Variable Distance 1 | Variable Distance 2 | Variable Distance 3 | Variable Distance 4 |
|---|---|---|---|---|
| W (f = 8.05) | 0.2 | 17.08313 | 4.388175 | 4.437559 |
| M (f = 16.07) | 10.217877 | 7.007802 | 1.286246 | 8 |
| T (f = 31.31) | 19.334206 | 0.799915 | 0.8 | 15 |

Figure 4:
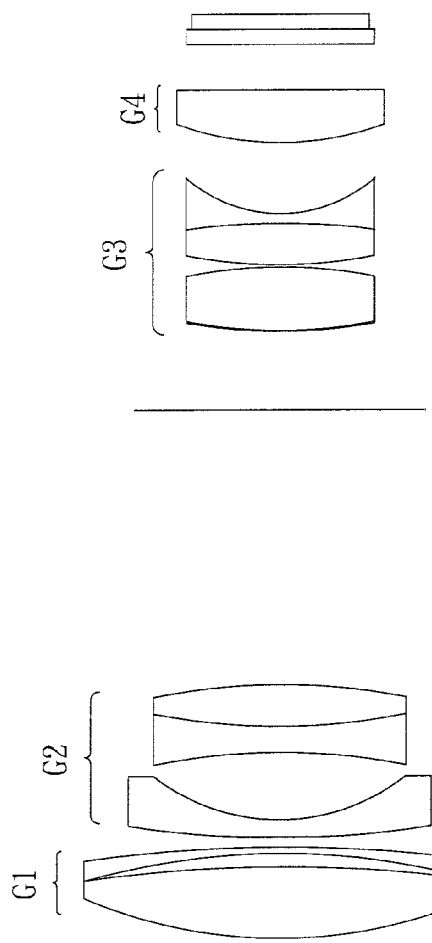
FIGS. 4 and 5 respectively illustrate positions of lens groups constituting the zoom lens system in accordance with Numeral Embodiment 1 of the present invention at the wide-angle end and the telephoto end.
Figure 5:
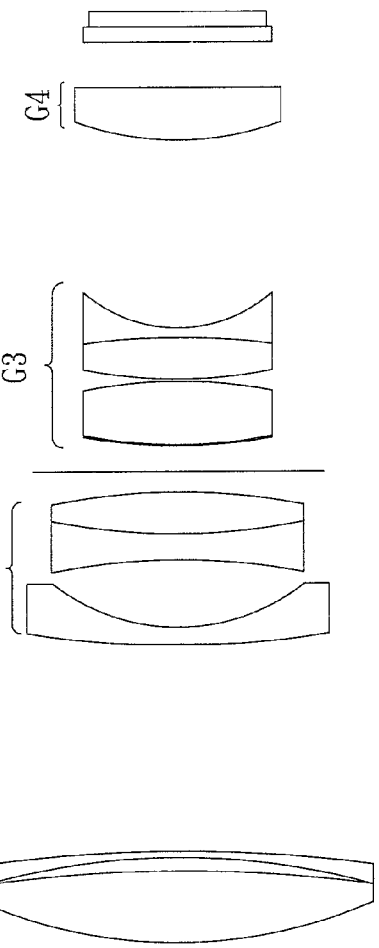
Figures 10, 11:
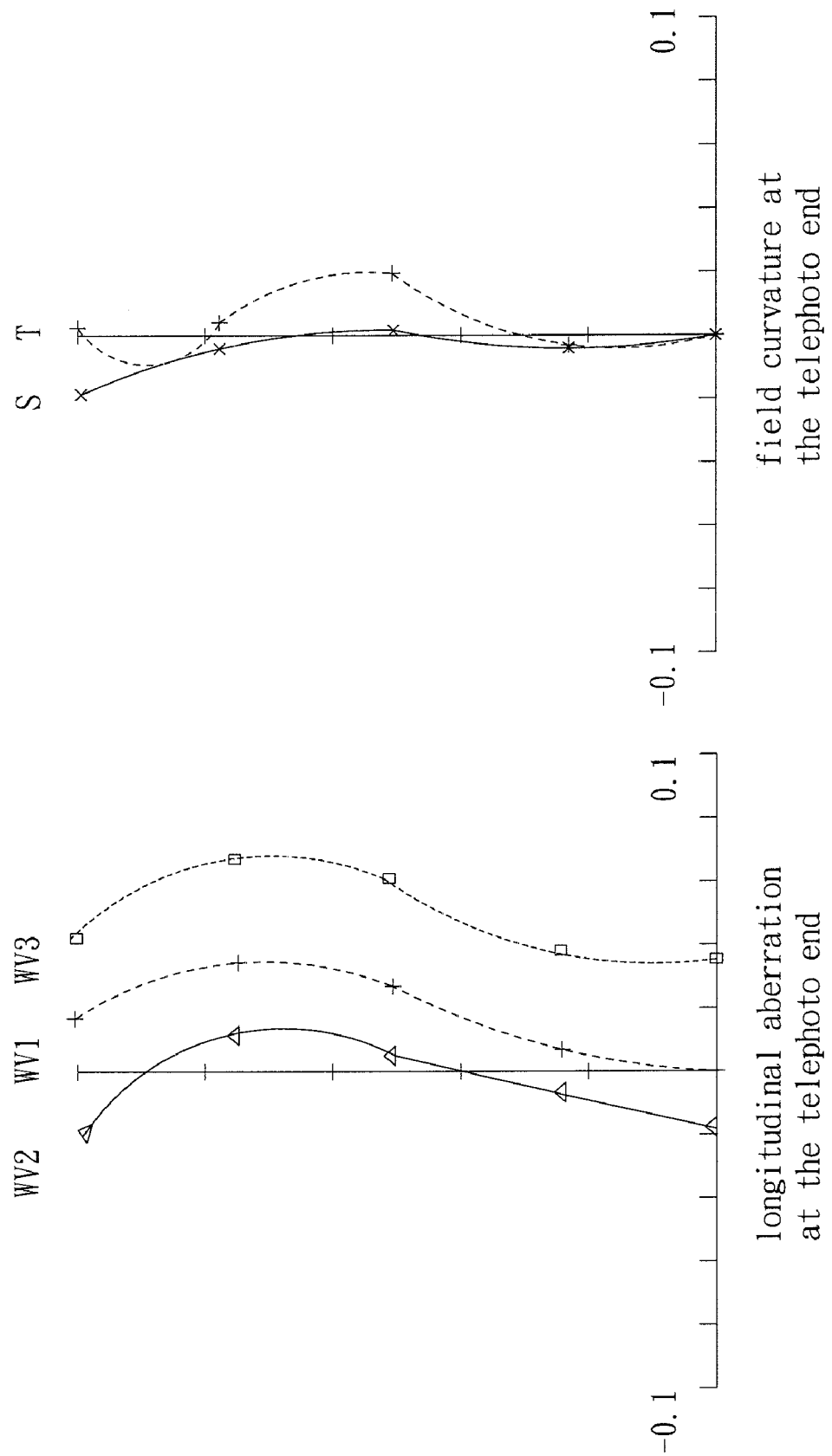
FIG. 10 shows spherical longitudinal aberration at the telephoto end of the zoom lens system of Numerical Embodiment 1 in accordance with the present invention.
FIG. 11 shows field curvature at the telephoto end of the zoom lens system of Numerical Embodiment 1 in accordance with the present invention.

FIGS. 4 and 5 respectively show positions of lens groups constituting the zoom lens system of Numerical Embodiment 1 at the wide-angle end and the telephoto end. It is shown that, during focal length change, the first lens group G1 and the fourth lens group G4 remain stationary. The positions of the second lens group G2, the stop and the third lens group G3 are changed to obtain a desired zoom ratio and a better image. The first, second and third lens groups G1, G2 and G3 satisfy the following conditions:

In Table 1, it is noted that since lens L4 and lens L5 of the second lens group G2 are cemented with each other, the image-side surface of lens L4 is exactly coincident with the object-side surface of lens L5. Thus, lens L4 is shown having only one surface in Table 1. This also applies to lenses L7 and L8 of the third group G3, and the resin layer P1 of the lens L6.

Table 2 shows aspheric coefficients of aspheric lens surfaces for Numerical Embodiment 1. It can be seen that, in Numerical Embodiment 1, the two surfaces of the first aspheric lens L3, the object-side surface of the resin hybrid lens L6 and the object-side surface of the second aspheric lens L9 are aspheric. These aspheric surfaces are expressed by the following equation:

$$0.15 < \left|\frac{F2}{F1}\right| < 0.4$$

$$0.55 < \left|\frac{F2}{F3}\right| < 1.2$$

where, F1 represents the focal length of the first lens group G1, F2 represents the focal length of the second lens group G2, and F3 represents the focal length of the third lens group G3.

FIGS. 6-13 show various aberrations at the wide-angle end and the telephoto end of the zoom lens system of Numerical Embodiment 1. FIG. 6 shows spherical longitudinal aberration of Numerical Embodiment 1 at the wide-angle end, and the vertical axis for spherical longitudinal aberration indicates incident ray height values of incident lights at wavelengths WV1, WV2 and WV3, and the horizontal axis represents the displacement (unit: mm) along the optical axis from the paraxial image plane.

FIG. 7 shows field curvature of Numerical Embodiment 1 at the wide-angle end. The vertical axis for field curvature (for wavelength WV1) indicates a perspective angle (unit: degrees) with respect to the optical axis, and the horizontal axis indicates an amount of field curvature (unit: mm). The reference letters "T" and "S" in the field curvature plot respectively designate a tangential direction and a sagittal direction. The differences between the tangential direction and the sagittal direction are clearly shown.

FIG. 8 shows distortion of Numerical Embodiment 1 at the wide-angle end. The horizontal axis for distortion (for wavelength WV1) shows distortion percentage relative to ideal image height. It shows that the distortion of the present zoom lens system at the wide-angle end is larger than −5%. This negative value indicates barrel distortion, which is also called negative distortion.

FIG. 9 shows lateral chromatic aberration at the wide-angle end of Numerical Embodiment 1. The vertical axis for lateral chromatic aberration indicates a perspective angle (unit: degrees) with respect to the optical axis, and the horizontal axis indicates an amount of lateral chromatic aberration (unit: mm). The reference letters "P" and "S" in the lateral chromatic aberration plot respectively designate the primary lateral color and the secondary lateral color. The primary lateral color describes the difference in effective focal lengths of the lens system for red and blue right, and the secondary lateral color arises from the fact that the refractive index of glass does not vary linearly with wavelength.

FIGS. 10-13 respectively show spherical longitudinal aberration, field curvature, distortion, and lateral chromatic aberration of Numeral Embodiment 1 at the telephoto end. In the distortion plot of FIG. 12, it shows that the distortion of the zoom lens system of Numerical Embodiment 1 at the telephoto end is about 1%. This positive value indicates pincushion distortion, which is also called positive distortion. The distortion plots of FIGS. 8 and 12 illustrate the improved optical performance of the zoom lens system in accordance with the present invention, and also evidence that distortion tends to be more noticeable at the wide-angle end than the telephoto end.

Provided below is a description of Numerical Embodiments 2 and 3 of the zoom lens system in accordance with the present invention. The numerical data of constituent lenses and the variable distances between adjacent lens groups of Numerical Embodiments 2 and 3 are varied relative to Numerical Embodiment 1, because the system focal lengths and the field angles of the Numerical Embodiments 1-3 are slightly different from each other.

Tables 4-6 show numerical data, lens arrangement and aberration plots of the zoom lens system in accordance with Numerical Embodiment 2. Table 4 shows numerical data of constituent lenses for Numerical Embodiment 2, wherein the F-number (Fno) is 2.8 to 4.4.

TABLE 4

| Surface (i) | Ri (mm) | D (mm) | Nd | Vd | Lens | Group |
|---|---|---|---|---|---|---|
| 1 | 30.785 | 5.99 | 1.4875 | 70.23 | L1 | G1 |
| 2 | −112.994 | 0.482 | | | | |
| 3 | −73.675 | 1.1 | 1.8466 | 23.78 | L2 | |
| 4 | −102.5261 | variable distance 1 | | | | |
| 5 | 250.1909 | 2.3 | 1.5855 | 29.9 | L3 | G2 |
| 6 | 8.1606 | 6.012 | | | | |
| 7 | −18.5408 | 2.4 | 1.4875 | 70.23 | L4 | |
| 8 | 15.87 | 4.747 | 1.8052 | 25.43 | L5 | |
| 9 | −188.8243 | variable distance 2 | | | | |
| STOP | infinite | variable distance 3 | | | | |
| 11 | 12.2297 | 0.08 | 1.52 | 52 | P1 | G3 |
| 12 | 11.5217 | 5.3 | 1.5688 | 56.36 | L6 | |
| 13 | −21.0762 | 0.1 | | | | |
| 14 | 13.1170 | 4.171 | 1.7432 | 49.3 | L7 | |
| 15 | −52.5876 | 1.279 | 1.8466 | 23.8 | L8 | |
| 16 | 6.9 | variable distance 4 | | | | |
| 17 | 10.4217 | 4.8 | 1.5247 | 56.2 | L9 | G4 |
| 18 | 361.2205 | 0 | | | | |
| 19 | infinite | 2.0 | 1.51633 | 64.1 | CG | |
| 20 | infinite | | | | | |

Table 5 shows aspheric coefficients of aspheric surfaces for Numerical Embodiment 2. It can be seen that the object-side surface of the first aspheric lens L3, the object-side surface of the resin hybrid lens L6 and the object-side surface of the second aspheric lens L9 are aspheric.

TABLE 5

| surface (i) | K | $E_4$ | $E_6$ | $E_8$ | $E_{10}$ |
|---|---|---|---|---|---|
| 5 | 0 | $3.6868 \times 10^{-5}$ | $-1.3882 \times 10^{-7}$ | $4.2351 \times 10^{-10}$ | 0 |
| 11 | 0 | $-1.57 \times 10^{-4}$ | $9.7583 \times 10^{-7}$ | $-4.1163 \times 10^{-8}$ | $6.3989 \times 10^{-10}$ |
| 17 | 0 | $-6.3985 \times 10^{-5}$ | $6.2073 \times 10^{-7}$ | $-1.1467 \times 10^{-8}$ | $4.3291 \times 10^{-11}$ |

Table 6 shows variable distances between adjacent lens groups at the respective system effective focal lengths, namely at the wide-angle end (W, f=8.09), an intermediate zoom position (M, f=16.05) and the telephoto end (T, f=31.28) of the zoom lens system of Numerical Embodiment 2.

TABLE 6

| Effective Focal Length | Variable Distance 1 | Variable Distance 2 | Variable Distance 3 | Variable Distance 4 |
|---|---|---|---|---|
| W (f = 8.09) | 0.965 | 16.0326 | 4.6212 | 3.3118 |
| M (f = 16.05) | 10.507 | 6.69 | 1.14 | 6.7124 |
| T (f = 31.28) | 19.652 | 0.8 | 1.0 | 14.408 |

Figure 14:
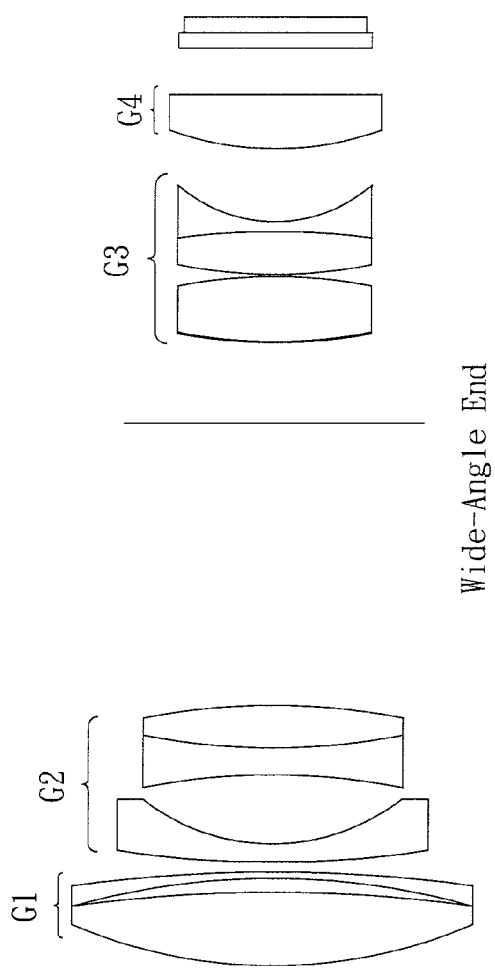
FIGS. 14 and 15 respectively illustrate positions of lens groups constituting the zoom lens system in accordance with Numeral Embodiment 2 of the present invention at the wide-angle end and the telephoto end.
Figure 15:
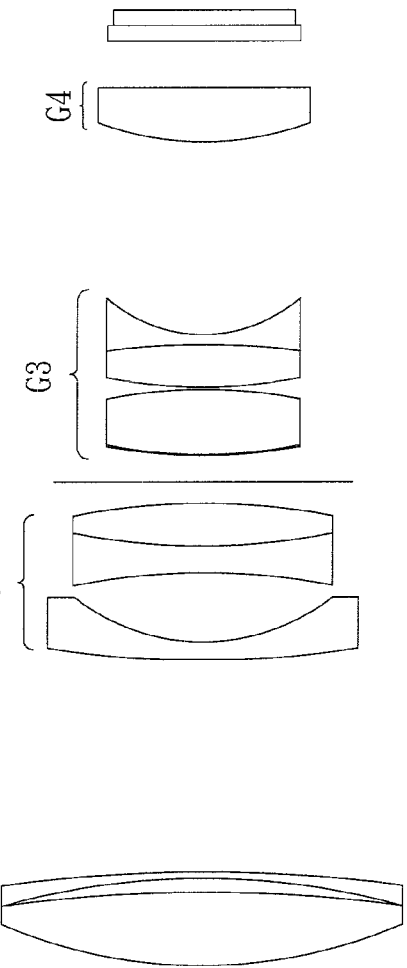
Figures 20, 21:
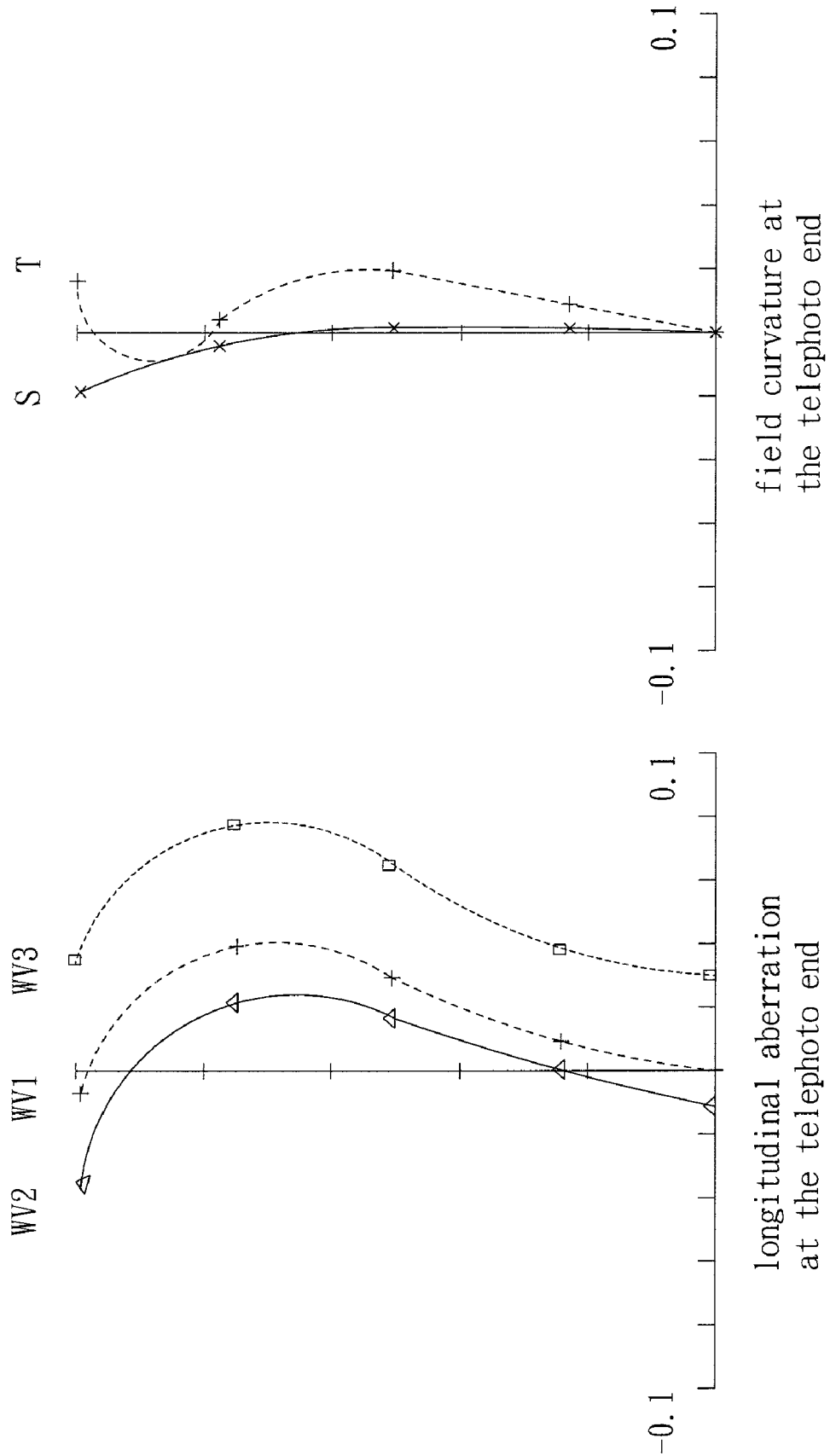
FIG. 20 shows spherical longitudinal aberration at the telephoto end of the zoom lens system of Numerical Embodiment 2 in accordance with the present invention.
FIG. 21 shows field curvature at the telephoto end of the zoom lens system of Numerical Embodiment 2 in accordance with the present invention.
Figures 30, 31:
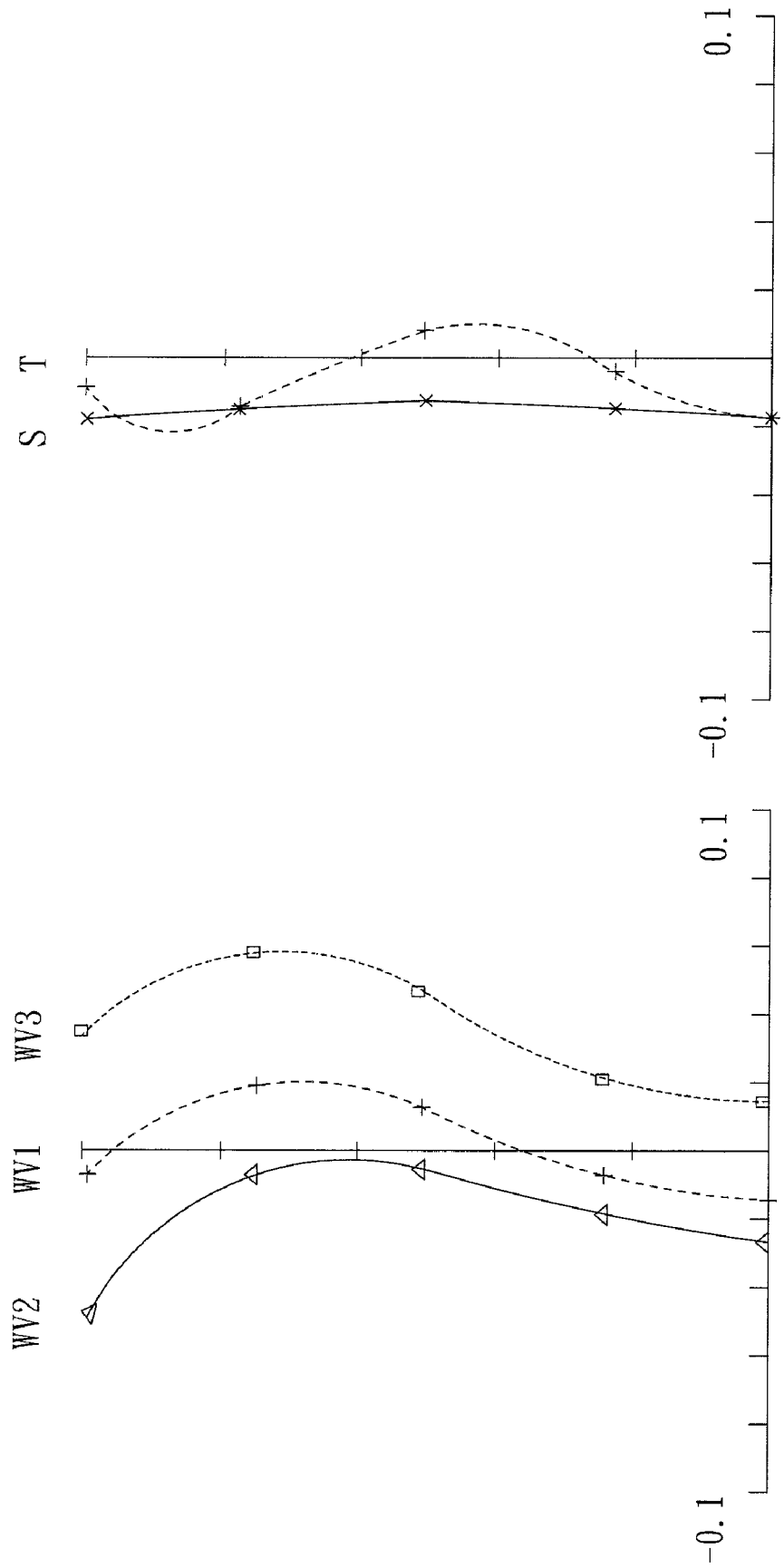
FIG. 30 shows spherical longitudinal aberration at the telephoto end of the zoom lens system of Numerical Embodiment 3 in accordance with the present invention.
FIG. 31 shows field curvature at the telephoto end of the zoom lens system of Numerical Embodiment 3 in accordance with the present invention.

FIGS. 14 and 15 respectively show positions of lens groups constituting the zoom lens system of Numerical Embodiment 2 at the wide-angle end and the telephoto end. FIGS. 16-23 respectively show spherical longitudinal aberration, field curve, distortion, and lateral chromatic aberration at the wide-angle end and telephoto end of the zoom lens system of Numerical Embodiment 2.

Tables 7-9 show numerical data, lens arrangement and aberration plots of the zoom lens system in accordance with Numerical Embodiment 3. Table 7 shows numerical data of constituent lenses for Numerical Embodiment 3, wherein the F-number (Fno) is 2.8 to 4.3.

TABLE 7

| Surface (i) | Ri (mm) | D (mm) | Nd | Vd | Lens | Group |
|---|---|---|---|---|---|---|
| 1 | 31.2249 | 5.96 | 1.4875 | 70.23 | L1 | G1 |
| 2 | −109.5612 | 0.6 | | | | |
| 3 | −70.5909 | 1.1 | 1.8466 | 23.78 | L2 | |
| 4 | −94.8783 | variable distance 1 | | | | |
| 5 | −3516.7 | 2.4 | 1.5855 | 29.9 | L3 | G2 |
| 6 | 8.2874 | 5.823 | | | | |
| 7 | −18.1746 | 2.4 | 1.4875 | 70.23 | L4 | |
| 8 | 16.8287 | 4.443 | 1.8052 | 25.43 | L5 | |
| 9 | −107.6307 | variable distance 2 | | | | |
| STOP | infinite | variable distance 3 | | | | |
| 11 | 11.7692 | 0.08 | 1.52 | 52 | P1 | G3 |
| 12 | 11.0687 | 5.3 | 1.5688 | 56.36 | L6 | |
| 13 | −22.8689 | 0.1 | | | | |
| 14 | 12.4824 | 4.066 | 1.7432 | 49.3 | L7 | |
| 15 | −66.7229 | 0.741 | 1.8466 | 23.8 | L8 | |
| 16 | 6.8443 | variable distance 4 | | | | |
| 17 | 10.2937 | 4.8 | 1.5247 | 56.2 | L9 | G4 |
| 18 | 159.0927 | 0 | | | | |
| 19 | infinite | 2.0 | 1.51633 | 64.1 | CG | |
| 20 | infinite | | | | | |

Table 8 shows aspheric coefficients of aspheric surfaces for Numerical Embodiment 3. It can be seen that the two surfaces of the first aspheric lens L3, the object-side surface of the resin hybrid lens L6 and the object-side surface of the second aspheric lens L9 are aspheric.

TABLE 8

| surface (i) | K | $E_4$ | $E_6$ | $E_8$ | $E_{10}$ |
|---|---|---|---|---|---|
| 5 | 0 | $6.0725 \times 10^{-5}$ | $-2.8236 \times 10^{-7}$ | $4.7037 \times 10^{-10}$ | $9.4522 \times 10^{-13}$ |
| 6 | 0 | $2.2893 \times 10^{-5}$ | $8.292 \times 10^{-7}$ | $-8.5921 \times 10^{-9}$ | 0 |
| 11 | 0 | $-1.49 \times 10^{-4}$ | $5.9831 \times 10^{-7}$ | $-4.0203 \times 10^{-8}$ | $7.8332 \times 10^{-10}$ |
| 17 | 0 | $-7.7792 \times 10^{-5}$ | $6.6779 \times 10^{-7}$ | $-1.4069 \times 10^{-8}$ | $6.3954 \times 10^{-11}$ |

Table 9 shows variable distances between adjacent lens groups at the respective system effective focal lengths, namely at the wide-angle end (W, f=8.1), an intermediate zoom position (M, f=16.07), and the telephoto end (T, f=31.34) of the zoom lens system of Numerical Embodiment 3.

TABLE 9

| Effective Focal Length | Variable Distance 1 | Variable Distance 2 | Variable Distance 3 | Variable Distance 4 |
|---|---|---|---|---|
| W (f = 8.1) | 0.3 | 16.6961 | 3.915 | 3.6258 |
| M (f = 16.07) | 10.477 | 6.886 | 1.14 | 7.296 |
| T (f = 31.34) | 19.779 | 0.8 | 1.0 | 15 |

FIGS. 24 and 25 respectively show positions of lens groups constituting the zoom lens system of Numerical Embodiment 3 at the wide-angle end and the telephoto end. FIGS. 26-33 respectively show spherical longitudinal aberration, field curve, distortion, and lateral chromatic aberration at the wide-angle end and telephoto end of the zoom lens system of Numerical Embodiment 3.

In comparison with the prior art, the zoom lens system in accordance with the present invention adopts four lens groups to obtain a four-times zoom ratio, so that the overall length of the zoom lens of the present invention can be reduced as compared to the conventional three-group configuration. Further, the zoom lens system of the present invention employs two plastic aspheric lenses (namely lens L3 and lens L9) and a resin hybrid lens (namely lens L6), so that the number of constituent lenses and thus the manufacture cost are significantly reduced while offering a high image performance. In addition, the two lenses L1 and L2 of the first lens group G1 of the zoom lens system in accordance with the present invention are arranged in an abutting relationship with each other, and the second and third lens groups G2 and G3 each include a pair of cemented lenses L4, L5; L7, L8. This arrangement facilitates assembling of the lens system.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens system, comprising, in order from an object side to an image side:
   a first lens group having positive refractive power;
   a second lens group having negative refractive power, the second lens group comprising a first aspheric lens;
   a movable stop;
   a third lens group having positive refractive power, the third lens group comprising a hybrid lens; and
   a fourth lens group having positive refractive power, the fourth lens group comprising a second aspheric lens;
   wherein the first and fourth lens groups are stationary and the second and third lens groups are movable relative to the first and fourth lens groups for varying the focal length, and wherein the second lens group and the third lens group satisfy the following condition:

$$0.55 < \left| \frac{F2}{F3} \right| < 1.2$$

where F2 represents the focal length of the second lens group, and F3 represents the focal length of the third lens group.

2. The zoom lens system as claimed in claim 1, wherein the first lens group consists of, in order from the object side, a positive lens and a negative lens.

3. The zoom lens system as claimed in claim 2, wherein the positive lens and the negative lens of the first lens group are arranged in an abutting relationship with each other.

4. The zoom lens system as claimed in claim 1, wherein the second lens group further comprises, in order from the object side, a negative lens and a positive lens, the negative lens and the positive lens being on the image side of the first aspheric lens.

5. The zoom lens system as claimed in claim 4, wherein the negative lens and the positive lens of the second lens group are cemented with each other.

6. The zoom lens system as claimed in claim 4, wherein the third lens group further comprises, in order from the object side, a positive lens and a negative lens, the positive lens and the negative lens being on the image side of the hybrid lens.

7. The zoom lens system as claimed in claim 6, wherein the positive lens and the negative lens of the third lens group are cemented with each other.

8. The zoom lens system as claimed in claim 1, wherein the second aspheric lens of the fourth lens group has at least one aspheric surface.

9. The zoom lens system as claimed in claim 1, wherein the first aspheric lens of the second lens group is made of plastic.

10. The zoom lens system as claimed in claim 1, wherein the hybrid lens of the third lens group is composed of a positive lens and a resin layer formed on an object side of the positive lens.

11. The zoom lens system as claimed in claim 1, wherein the second aspheric lens of the fourth lens group is made of plastics.

12. The zoom lens system as claimed in claim 1, wherein the first lens group and the second lens group satisfy the following condition:

$$0.15 < \left|\frac{F2}{F1}\right| < 0.4$$

where F1 represents the focal length of the first lens group and F2 represents the focal length of the second lens group.

13. The zoom lens system as claimed in claim 1 further comprising a cover glass arranged on the image side of the fourth lens group.

14. The zoom lens system as claimed in claim 13, wherein the cover glass is coated with an anti-reflection film.

15. The zoom lens system as claimed in claim 13, wherein the cover glass is coated with an infrared filtering film.

* * * * *